May 16, 1939.  C. E. K. MEES  2,158,882

PHOTOGRAPHIC EMULSION

Filed Jan. 16, 1937

FIG. 1
A = 2,2'-DIMETHYL-8-ETHYLTHIACARBOCYANINE.
B = 2,1'-DIETHYL-4-CHLOROTHIA-2'-CYANINE.
C = MIXTURE

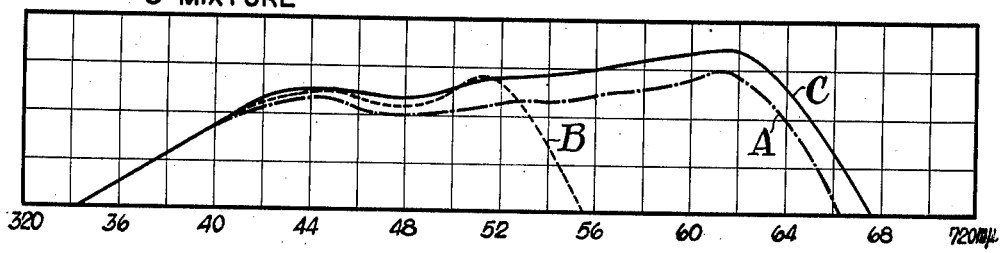

FIG. 2
D = 2,2'-DIETHYL-8-METHYL-3,4,3',4',-DIBENZOTHIACARBOCYANINE
E = 2,1'-DIETHYL-4-CHLOROTHIA-2'-CYANINE
F = MIXTURE

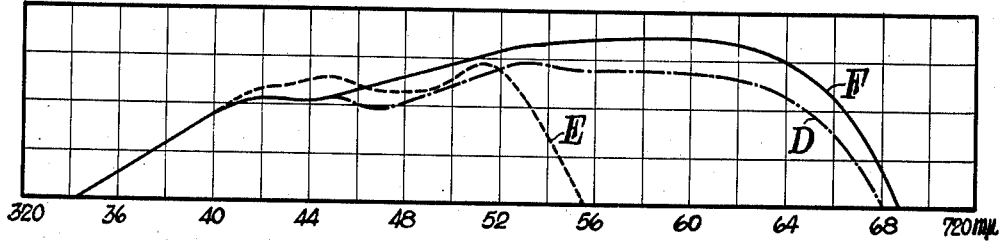

FIG. 3
G = 2,2'-DIETHYL-8-METHYLSELENACARBOCYANINE.
H = 3,1'-DIETHYL-4-PHENYLOXAZOLO-2'-CYANINE.
I = MIXTURE.

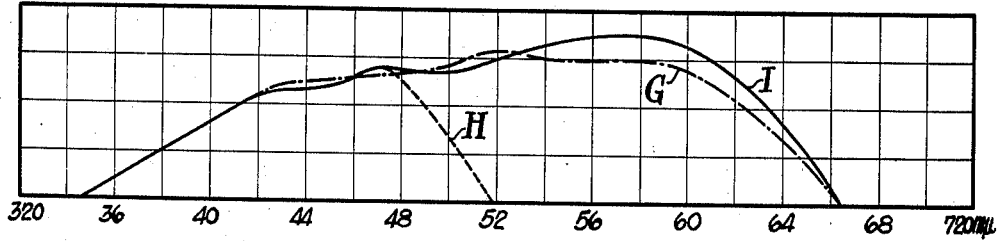

FIG. 4
J = 2,2'-DIETHYL-8-METHYL-3.4-BENZOTHIACARBOCYANINE.
K = 2,1'-DIETHYL-3.4-BENZOTHIA-2'-CYANINE.
L = MIXTURE.

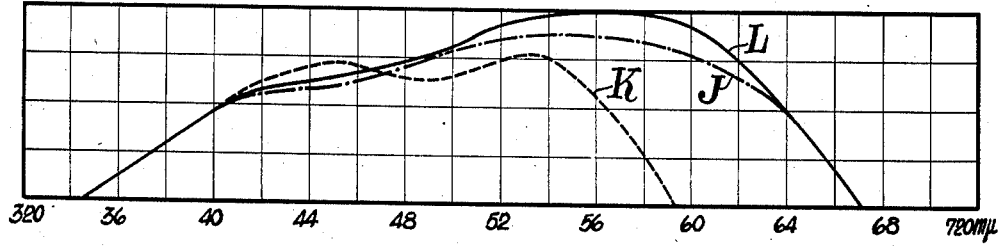

Charles E. K. Mees,
INVENTOR:
Newton M. ......
Daniel J. Mayne
BY
ATTORNEYS.

Patented May 16, 1939

2,158,882

UNITED STATES PATENT OFFICE 2,158,882

PHOTOGRAPHIC EMULSION

Charles E. K. Mees, Rochester, N. Y., assignor to Eastman Kodak Company, Rochester, N. Y., a corporation of New Jersey Application January 16, 1937, Serial No. 120,966

17 Claims. (Cl. 95—7)

This invention relates to sensitized photographic emulsions and more particularly to photographic emulsions, such as those of the gelatino-silver-halide type, containing a mixture or combination of two more sensitizing materials, at least one of which cooperates with at least one other to alter the sensitivity of the emulsion to a greater degree than is possible with any one of the sensitizing materials alone. The sensitization produced by my combinations is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photographic emulsions that certain dyes of the cyanine class alter the sensitivity of photographic emulsions of the gelatino-silver-halide type, when incorporated therein. The sensitizing effect produced by the dyes does not increase proportionally to the amount of dye, but passes through a maximum as the concentration is increased. Within the range of concentration most useful in practice, the sensitivity increases much more slowly than the concentration of the dye. Likewise, the combined effect of two or more dyes on an emulsion is rarely equivalent to the sum of their separate effects; in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found with certain mixtures or combinations of two or more cyanine dyes, that the sensitization is substantially greater, in some spectral region, than that of any one of the dyes in the absence of the other or others. I will call this phenomenon supersensitization. In general at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a highly specific phenomenon and is found only in mixtures or combinations of dyes from certain groups. In the instant application, this phenomenon generally takes the form of an increase in the sensitization produced by one or more dyes for the red end of the spectrum, upon the admixture of one or more dyes which in themselves are sensitizers for only shorter wavelengths. The magnitude of supersensitization depends upon the relative and absolute concentrations of the dyes in the emulsion and on the type of emulsion. In the instant application, the supersensitizing effects have been clearly demonstrated under suitable conditions which are applicable to commercial practice.

In my copending application Serial No. 641,177, filed November 4, 1932, (now United States Patent No. 2,075,046, dated March 30, 1937) I have described emulsions containing supersensitizing combinations of pinacyanol with dialkylaminostyryl derivatives of alkyl quaternary salts of simple nitrogen-containing heterocyclic bases; in my copending application Serial No. 641,178, filed November 4, 1932, (now United States Patent No. 2,075,047, dated March 30, 1937) are described emulsions containing supersensitizing combinations of sulfur on selenium-containing pseudocyanine dyes with styryl derivatives of alkyl quaternary salts of simple nitrogen heterocyclic bases; and, in my copending application Serial No. 641,179, filed November 4, 1932, (now United States Patent No. 2,075,048, dated March 20, 1937) are described emulsions containing supersensitizing combinations of sulfur or selenium-containing carbocyanine dyes with 2,2'-dialkyl-8-alkyl 3,4,3',4'-dibenzothiacarbocyanine dyes.

My instant application deals with emulsions containing supersensitizing mixtures or combinations of one or more sulfur or selenium-containing 8-alkylcarbocyanine dyes, such as the 8-alkylthiacarbocyanines, the 8-alkylselenacarbocyanines, the 8-alkylbenzothiacarbocyanines, the 8-alkylthiaselenacarbocyanines, the 8-alkylselenabenzothiacarbocyanines, and the 8-alkyldibenzothiacarbocyanines, with one or more 2'-cyanine (pseudocyanine) dyes, such as 2,2'-cyanines, thia-2'-cyanines, selena-2'-cyanines, benzothia-2'-cyanines, thiazolo-2'-cyanines, selenazolo-2'-cyanines and oxazolo-2'-cyanines. Just how the dyes of my mixtures cooperate to give supersensitizing effect is not known. I shall refer to the mixtures as combinations, although I do not intend to imply that the dyes are chemically combined.

An object of my invention, therefore, is to provide photographic emulsions containing a supersensitizing combination of cyanine dyes. A further object is to provide a process for sensitizing photographic emulsions with supersensitizing combinations of dyes and to provide a method for increasing the red sensitivity of emulsions sensitized to the red region of the spectrum. A still further object is to provide a photographic element comprising a support coated with such supersensitized emulsions. Other more specific objects will become apparent upon a complete perusal of these specifications.

While there is more than one manner of formulating and naming the dyes which I employ in practicing my invention, it is believed that the formulas, systems of numbering and names used herein are in accordance with those used during the development of the cyanine dye art to its present stage. The most probable formulas of representative dye-types are given below, in order to clearly set forth the nature of the materials employed in my supersensitizing mixtures. These formulas should not be construed as limiting my invention, except as indicated in the appended claims.

Among the sulfur or selenium-containing 8-alkylcarbocyanine dyes useful in practicing my invention are the following:

The 8-alkylthiacarbocyanines, which can be represented by the following general formula:

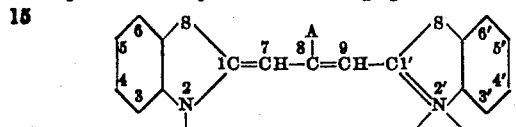

The 8-alkylselenacarbocyanines, which can be represented by the following general formula:

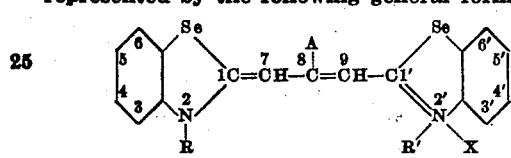

The 8-alkyldibenzothiacarbocyanines, which can be represented by the following general formula:

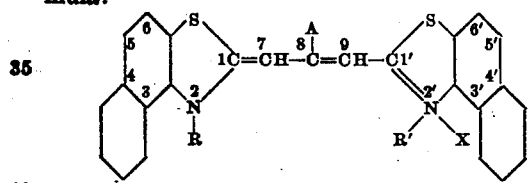

The 8-alkylthiaselenacarbocyanines can be represented by the following general formula:

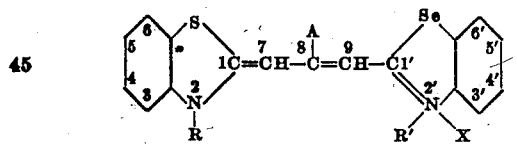

The 8-alkylselenabenzothiacarbocyanines, which can be represented by the following general formula:

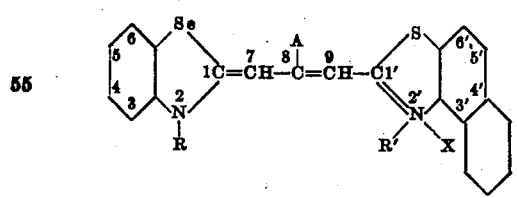

The 8-alkylbenzothiacarbocyanines, which can be represented by the following general formula:

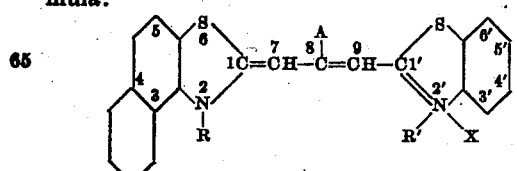

In all of the above formulas A, R and R' represent alkyl groups and X represents an acid radical. I have found it convenient to employ the carbocyanine dye-iodides (where X represents iodine) in practicing my invention. However, other dye-salts, such as the chlorides, bromides, perchlorates, alkylsulfates or alkyl-p-toluenesulfonates can be employed, for example. I have also found it advantageous to employ the dyes wherein A represents methyl or ethyl and R and R' represent an alkyl group of one to four carbon atoms in practicing my invention. More specifically, I have found the dyes wherein A represents methyl or ethyl and R and R' represent ethyl to be especially useful. The nuclei of the dyes can carry simple substituents which do not interfere with sensitizing properties, such as for example alkyl, alkoxy, chloro or amino groups.

The 8-alkylthiacarbocyanines, wherein R and R' represent the same alkyl group, can be prepared by reacting 1-methylbenzothiazole alkyl quaternary salts with trialkyl ortho esters of monobasic carboxylic acids of two or more carbon atoms, in the presence of dry pyridine, as described in U. S. Patent No. 1,934,657. The 8-alkylselenacarbocyanines, wherein R and R' represent the same alkyl group, can be prepared by reacting 1-methylbenzoselenazole alkyl quaternary salts with trialkyl ortho esters of monobasic carboxylic acids of two or more carbon atoms, in the presence of an organic base, as described in U. S. Patent No. 1,990,681. The 8-alkyldibenzothiacarbocyanines can be prepared by reacting 1-methyl-α-naphthothiazole or 2-methyl-β-naphthothiazole alkyl quaternary salts with trialkyl ortho esters of monobasic carboxylic acids of two or more carbon atoms, in the presence of pyridine, as described in U. S. Patent No. 1,969,444. The 8-alkylthiacarbocyanines, 8-alkylselenacarbocyanines and 8-alkyldibenzothiacarbocyanines, wherein R and R' represent different alkyl groups, as well as the unsymmetrical 8-alkylthiaselenacarbocyanines, 8-alkylselenabenzothiacarbocyanines and 8-alkylbenzothiacarbocyanines can be prepared as described in the copending application of Leslie G. S. Brooker and Frank L. White, Serial No. 30,736, filed July 10, 1935. This latter method comprises reacting acylmethylene derivatives, such as 1-acetylmethylene-2-ethylbenzothiazoline, 1-ethyl-2-propionylmethylene-β-naphthothiazoline, 2-ethyl-1-propionylmethylene-benzoselenazoline for example, with 1-methylbenzothiazole, 1-methylbenzoselenazole, 1-methyl-α-naphthothiazole or 2-methyl-β-naphthothiazole alkyl quaternary salts, in the presence of acetic anhydride or other water-binding agent.

Among the pseudocyanine dyes which can be employed in practicing my invention are the following:

The 2,2'-cyanine dyes, which can be represented by the following general formula:

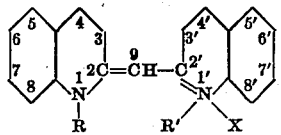

The thia-2'-cyanine dyes, which can be represented by the following general formula:

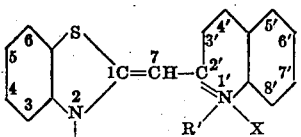

The selena-2'-cyanine dyes, which can be represented by the following general formula:

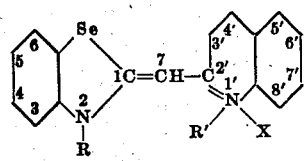

The benzothia-2'-cyanine dyes, which can be represented by the following general formula:

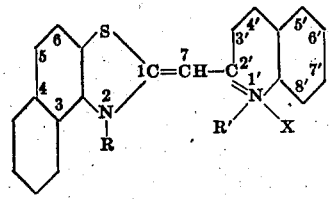

The oxazolo-2'-cyanine dyes, which can be represented by the following general formula:

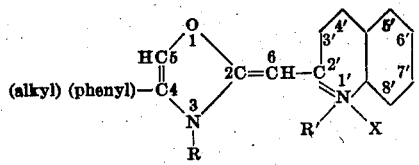

The thiazolo-2'-cyanine dyes, which can be represented by the following general formula:

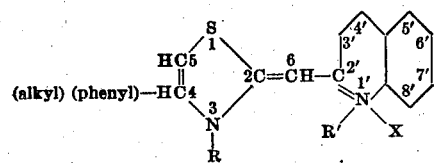

In all of the above formulas of pseudocyanine dyes, R and R' represent alkyl groups and X represents an acid radical. The oxazolo-2'-cyanines and thiazolo-2'-cyanines can be substituted in the five position with substituents, such as alkyl or aryl group of the benzene series for example phenyl. The selenazolo-2'-cyanine dyes can also be employed in my supersensitizing combinations, though less advantageously. In practicing my invention, I have found it convenient to employ the pseudocyanine dye-iodides (wherein X represents iodine). However, other pseudocyanine salts can be employed, such for example as the chlorides, bromides, perchlorates, alkylsulfates or alkyl-p-toluenesulfonates. I have further found it advantageous to employ pseudocyanine dyes wherein R and R' represent an alkyl group of from one to four carbon atoms. The dyes wherein R and R' represent ethyl are particularly useful in practicing my invention. The pseudocyanine dyes can be substituted in their nuclei with simple substituents which do not interfere with sensitizing properties, such for example as alkyl, chloro, alkoxy or amino groups.

Brooker and Keyes in the Journal of the American Chemical Society, vol. 57, pages 2488–2491 (1935) review the literature pertaining to pseudocyanine dyes and describe a method for the preparation thereof. Oxazolo-, thiazolo- and selenazolo-2'-cyanine dyes are described in U. S. Patent No. 1,969,446.

The objects of my invention can be accomplished by merely incorporating one or more sensitizing 8-alkylcarbocyanine dyes, of the type described above, together with one or more sensitizing pseudocyanine dyes, of the type described above, in an ordinary photographic emulsion of ordinary concentration. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light sensitive materials. As silver halide emulsions, I include such emulsions as are commonly employed in the art, for example, silver chloride or silver bromide emulsions which can contain other salts which may be light sensitive. By way of illustration, the hereindescribed supersensitized emulsions were prepared employing an ordinary gelatino-silver-bromide emulsion of ordinary concentration (approximately 40 g. of silver halide per liter). The dyes were generally employed in concentrations of the order of 10 mg. each per liter of ordinary emulsion, but can be employed in concentrations several times greater or less than that. The ratio of concentration of the 8-alkylcarbocyanine dye to the concentration of pseudocyanine dye may be varied widely from 5:1 to 1:5, for example. The most favorable conditions for supersensitization of the desired magnitude must be determined by experiment, the manner of which will be apparent to those skilled in the art, upon a complete perusal of these specifications.

The methods of incorporating dyes in emulsions are simple and well known to those skilled in the art. In practicing my invention, the dyes of my combinations can be added separately or together. It is convenient to add the dyes separately in the form of their solutions in appropriate solvents. The solvent must, of course, be compatible with the emulsion, substantially free from any deleterious effect on the light sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate, other cellulose derivative or resin, in a manner well known in the art.

The following combinations or mixtures of dyes are illustrative of my invention. These illustrations are not intended to be limiting.

| 8-alkylcarbocyanines | Pseudocyanines |
|---|---|
| 2,2'-dimethyl-8-ethylthiacarbocyanine iodide, with | 2,1'-diethyl-4-chloro-thia-2'-cyanine iodide. |
| 2,2'-diethyl-8-methyl-3,4,3',4'-dibenzothiacarbocyanine iodide, with | Do. |
| 2,2'8-triethyl-4,4'-dichlorothiacarbocyanine iodide, with | 2,1'-diethyl-6'-methyl-3,4-benzothia-2'-cyanine iodide. |
| 2,2'-dimethyl-8-ethyl-thiacarbocyanine iodide, with | 3,1-diethyl-4-phenylthiazolo-2'-cyanine iodide |
| 2,2'8-triethylthiacarbocyanine iodide, with | 2,1'-diethylthia-2'-cyanine iodide. |
| 2,2'8-triethyl-3,4-benzothiacarbocyanine iodide, with | 1,1'-diethyl-2,-2'-cyanine iodide. |
| 2,2'-diethyl-8-methyl-3',4'-benzothiaselenacarbocyanine iodide, with | 2,1'-diethyl-thia-2'-cyanine iodide. |
| 2,2'-diethyl-8-methyl selenacarbocyanine bromide, with | 3,1'-diethyl-4-phenyloxazolo-2'-cyanine iodide. |

While I have illustrated only combinations containing one 8-alkylcarbocyanine and one pseudocyanine, my combinations can as well contain one 8-alkylcarbocyanine cooperating with two pseudocyanines to give a supersensitizing effect. Likewise, my combinations can contain one pseudocyanine cooperating with two 8-alkylcarbocyanine.

I have found the combination comprising sulfur-containing pseudocyanine dyes, particularly thia-2'-cyanine and 3,4-benzothia-2'-cyanine dyes, to be especially useful. 8-Alkylcarbocyanine or pseudocyanine dyes containing the 5,6-benzothia nucleus are almost generally of lesser utility in practicing my invention, combinations containing such dyes ordinarily showing smaller and in many cases much smaller supersensitizing effects. Likewise, combinations containing selenazolo-2'-cyanines are ordinarily of lesser utility. Among the oxazolo-, thiazolo- and selenazolo-2'-cyanines, those substituted in the four position of the oxazole, thiazole or selenazole nucleus by an alkyl group, such as methyl, or by an aryl group of the benzene series, such as phenyl, are especially useful in practicing my invention.

The accompanying drawing is by way of illustration and depicts the supersensitizing effect of four of my new combinations. Each figure of the drawing is a diagrammatic reproduction of three spectrograms showing first, the sensitivity of a silver bromide emulsion containing an 8-alkyl carbocyanine dye (represented by the dot and dash line in each figure), second, the sensitivity of the same silver bromide emulsion containing a pseudocyanine dye (represented by the dotted line in each figure) and third, the sensitivity of the same emulsion containing a mixture or combination of the said 8-alkylcarbocyanine dye with the said pseudocyanine dye (represented by the solid line in each figure). The supersensitizing effect is apparent from the drawing.

More specifically, in Fig. 1, curve A represents the sensitivity of an ordinary gelatino-silver-halide emulsion containing 2,2'-dimethyl-8-ethylthiacarbocyanine iodide in a concentration of about 10 mg. per liter of emulsion; curve B represents the sensitivity of the same emulsion containing 2,1'-diethyl-4-chlorothia-2'-cyanine iodide in a concentration of about 10 mg. per liter of emulsion and curve C represents the same emulsion containing 2,2'-dimethyl-8-ethylthiacarbocyanine iodide and 2,1'-diethyl-4-chlorothia-2'-cyanine iodide each in concentrations of about 10 mg. per liter of emulsion. The red sensitivity of the emulsion represented by curve C measured through a Wratten "A" filter is 50% greater than that of the emulsion represented by curve A.

In Fig. 2, curve D represents the sensitivity of an ordinary silver bromide emulsion containing 2,2'-diethyl-8-methyl-3,4,3',4'-dibenzothiacarbocyanine iodide in a concentration of about 10 mg. per liter, curve E represents the same emulsion containing 2,1'-diethyl-4-chlorothia-2'-cyanine iodide in a concentration of about 10 mg. per liter and curve F represents the sensitivity of the same emulsion containing 2,2'-diethyl-8-methyl-3,4,3',4'-dibenzothiacarbocyanine iodide and 2,1'-diethyl-4-chlorothia-2'-cyanine iodide each in a concentration of about 10 mg. per liter. The red sensitivity of the emulsion represented by curve F measured through a Wratten "A" filter is 50% greater than that of the emulsion represented by curve D.

In Fig. 3, curve G represents the sensitivity of ordinary silver bromide emulsion containing 2,2'-diethyl-8-methylselenacarbocyanine bromide in a concentration of about 10 mg. per liter, curve H represents the sensitivity of the same emulsion containing 3,1'-diethyl-4-phenyloxazolo-2'-cyanine iodide in a concentration of about 10 mg. per liter, curve I represents the sensitivity of the same emulsion containing 2,2'-diethyl-8-methylselenacarbocyanine bromide and 3,1'-diethyl-4-phenyloxazolo-2'-cyanine iodide, each in a concentration of about 10 mg. per liter. The red sensitivity of the emulsion represented by curve I measured through a Wratten "A" filter is double that of the emulsion represented by curve G.

In Fig. 4, curve J represents the sensitivity of an ordinary silver bromide emulsion containing 2,2'-diethyl-8-methyl-3,4-benzothiacarbocyanine iodide in a concentration of about 10 mg. per liter, curve K represents the sensitivity of the same emulsion containing 2,1'-diethyl-3,4-benzothia-2'-cyanine iodide, curve L represents the same emulsion containing 2,2'-diethyl-8-methyl-3,4-benzothiacarbocyanine iodide and 2,1'-diethyl-3,4-benzothia-2'-cyanine iodide each in a concentration of about 10 mg. per liter. The red sensitivity of the emulsion represented by curve L as measured through a Wratten "A" filter is 75% greater than that of the emulsion represented by curve J.

The spectrograms corresponding to the figures of the accompanying drawing were made in a wedge spectrograph. The intensity of each horizontal line was approximately $\frac{1}{10}$ that at the next lower line. Where the spectograms were compared, as in each of the figures of the drawing, the exposures were for the same time and test plates of each groups were developed together.

Still further examples showing the application of my invention could be cited, but the foregoing will be sufficient to teach those skilled in the art the manner in which my invention is carried out and the principles of sensitizing photographic emulsions with supersensitizing combinations such as described herein.

What I claim and desire to secure by Letters Patent of the United States is:

1. A photographic silver halide emulsion containing a supersensitizing combination of at least one sensitizing dye selected from the group consisting of 8-alkylthiacarbocyanine dyes, 8-alkylselenacarbocyanine dyes, 8-alkylthiaselenacarbocyanine dyes, 8-alkylbenzothiacarbocyanine dyes, 8-alkylselenabenzothiacarbocyanine dyes and 8-alkyldibenzothiacarbocyanine dyes with at least one sensitizing pseudocyanine dye.

2. A photographic gelatino-silver-halide emulsion containing a supersensitizing combination of at least one sensitizing dye selected from the group consisting of 8-alkylthiacarbocyanine dyes, 8-alkylselenacarbocyanine dyes, 8-alkylthiaselenacarbocyanine dyes, 8-alkylbenzothiacarbocyanine dyes, 8-alkylselenabenzothiacarbocyanine dyes and 8-alkyldibenzothiacarbocyanine dyes with at least one sensitizing pseudocyanine dye.

3. A photographic gelatino-silver-halide emulsion containing a supersensitizing combination of at least one 8-alkyl-3,4,3',4'-dibenzothiacarbocyanine dye with at least one thia-2'-cyanine dye.

4. A photographic gelatino-silver-halide emulsion containing a supersensitizing combination of at least one 8-alkyl-3,4-benzothiacarbocyanine dye with at least one 2,2'-cyanine dye.

5. A photographic gelatino-silver-halide emulsion containing a supersensitizing combination of at least one 8-alkylselenacarbocyanine dye with at least one oxazolo-2'-cyanine dye.

6. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkylselenacarbocyanine dyes, 2,2'-dialkyl-8-alkylbenzothiacarbocyanine dyes, 2,2'-dialkyl-8-dibenzothiacarbocyanine dyes, 2,2'-dialkyl-8-alkylselenathiacarbocyanine dyes and 2,2'-dialkyl-8-alkylselenabenzothiacarbocyanine dyes, in which the 8-alkyl group contains from one to two carbon atoms and the 2- and 2'-alkyl groups each contain from one to four carbon atoms, with a 2,1'-dialkylthia-2'-cyanine dye in which the 2- and 1'-alkyl groups contain from one to four carbon atoms.

7. A photographic gelatino-silver-halide emulsion containing a supersensitizing combination of a 2,2'-dialkyl-8-alkyl-3,4,3',4'-dibenzothiacarbocyanine halide, in which the 8-alkyl group contains from one to two carbon atoms and the 2- and 2'-alkyl groups each contain from one to four carbon atoms, with a 2,1'-dialkylthia-2'-cyanine halide in which the 2- and 1'-alkyl groups contain from one to four carbon atoms.

8. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkylselenacarbocyanine dyes, 2,2'-dialkyl-8-alkylbenzothiacarbocyanine dyes, 2,2'-dialkyl-8-dibenzothiacarbocyanine dyes, 2,2'-dialkyl-8-alkylselenathiacarbocyanine dyes and 2,2'-dialkyl-8-alkylselenabenzothiacarbocyanine dyes, in which the 8-alkyl group contains from one to two carbon atoms and the 2- and 2'-alkyl groups each contain from one to four carbon atoms, with a 1,1'-dialkyl-2,2'-cyanine dye in which the 1- and 1'-alkyl groups each contain from one to four carbon atoms.

9. A photographic gelatino-silver-halide emulsion containing a supersensitizing combination of a 2,2'-dialkyl-8-alkyl-3,4-benzothiacarbocyanine halide, in which the 8-alkyl group contains from one to two carbon atoms and the 2- and 2'-alkyl groups each contain from one to four carbon atoms, with a 1,1'-dialkyl-2,2'-cyanine halide in which the 1- and 1'-alkyl groups each contain from one to four carbon atoms.

10. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkylselenacarbocyanine dyes, 2,2'-dialkyl-8-alkylbenzothiacarbocyanine dyes, 2,2'-dialkyl-8-dibenzothiacarbocyanine dyes, 2,2'-dialkyl-8-alkylselenathiacarbocyanine dyes and 2,2'-dialkyl-8-alkylselenabenzothiacarbocyanine dyes, in which the 8-alkyl group contains from one to two carbon atoms and the 2- and 2'-alkyl groups each contain from one to four carbon atoms, with a 3,1'-dialkyl-4-phenyloxazolo-2'-cyanine dye in which the 3- and 1'-alkyl groups each contain from one to four carbon atoms.

11. A photographic gelatino-silver-halide emulsion containing a supersensitizing combination of a 2,2'-dialkyl-8-alkylselenacarbocyanine halide, in which the 8-alkyl group contains from one to two carbon atoms and the 2- and 2'-alkyl groups each contain from one to four carbon atoms, with a 3,1'-dialkyl-4-phenyloxazolo-2'-cyanine halide in which the 3- and 1'-alkyl groups contain from one to four carbon atoms.

12. A photographic gelatino-silver-halide emulsion containing a supersensitizing combination of 2,2'-diethyl-8-methyl-3,4,3',4'-dibenzothiacarbocyanine iodide with 2,1'-diethyl-4-chlorothia-2'-cyanine iodide.

13. A photographic gelatino-silver-halide emulsion containing a supersensitizing combination of 2,2'-diethyl-8-ethyl-3,4-benzothiacarbocyanine iodide with 1,1'-diethyl-2,2'-cyanine iodide.

14. A photographic gelatino-silver-halide emulsion containing a supersensitizing combination of 2,2'-diethyl-8-methylselenacarbocyanine bromide with 3,1'-diethyl-4-phenyloxazolo-2'-cyanine iodide.

15. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkylselenacarbocyanine dyes, 2,2'-dialkyl-8-alkylbenzothiacarbocyanine dyes, 2,2'-dialkyl-8-alkyldibenzothiacarbocyanine dyes, 2,2'-dialkyl-8-alkylselenathiacarbocyanine dyes and 2,2'-dialkyl-8-alkylselenabenzothiacarbocyanine dyes with at least one sensitizing pseudocyanine dye.

16. A photographic gelatino-silver-halide emulsion containing a supersensitizing combination of at least one sensitizing dye selected from the group consisting of 2,2'-dialkyl-8-alkylthiacarbocyanine dyes, 2,2'-dialkyl-8-alkylselenacarbocyanine dyes, 2,2'-dialkyl-8-alkylbenzothiacarbocyanine dyes, 2,2'-dialkyl-8-alkyldibenzothiacarbocyanine dyes, 2,2'-dialkyl-8-alkylselenathiacarbocyanine dyes and 2,2'-dialkyl-8-alkylselenabenzothiacarbocyanine dyes, in which the 8-alkyl group contains from one to two carbon atoms and the 2- and 2'-alkyl groups each contain from one to four carbon atoms, with at least one sensitizing pseudocyanine dye.

17. A photographic gelatino-silver-halide emulsion containing a supersensitizing combination of at least one sensitizing dye selected from the group consisting of 2,2'-diethyl-8-alkylthiacarbocyanine dyes, 2,2'-diethyl-8-alkylselenacarbocyanine dyes, 2,2'-diethyl-8-alkylbenzothiacarbocyanine dyes, 2,2'-diethyl-8-alkyldibenzothiacarbocyanine dyes, 2,2'-diethyl-8-alkylselenathiacarbocyanine dyes and 2,2'-diethyl-8-alkylselenabenzothiacarbocyanine dyes with at least one sensitizing pseudocyanine dye.

CHARLES E. K. MEES.